Oct. 28, 1969    G. C. PEARSON    3,474,551
MOBILE GRAVE EXCAVATOR
Filed Aug. 5, 1966    3 Sheets-Sheet 1

INVENTOR.
GUY C. PEARSON,
BY
Berman, Davidson & Berman
ATTORNEYS.

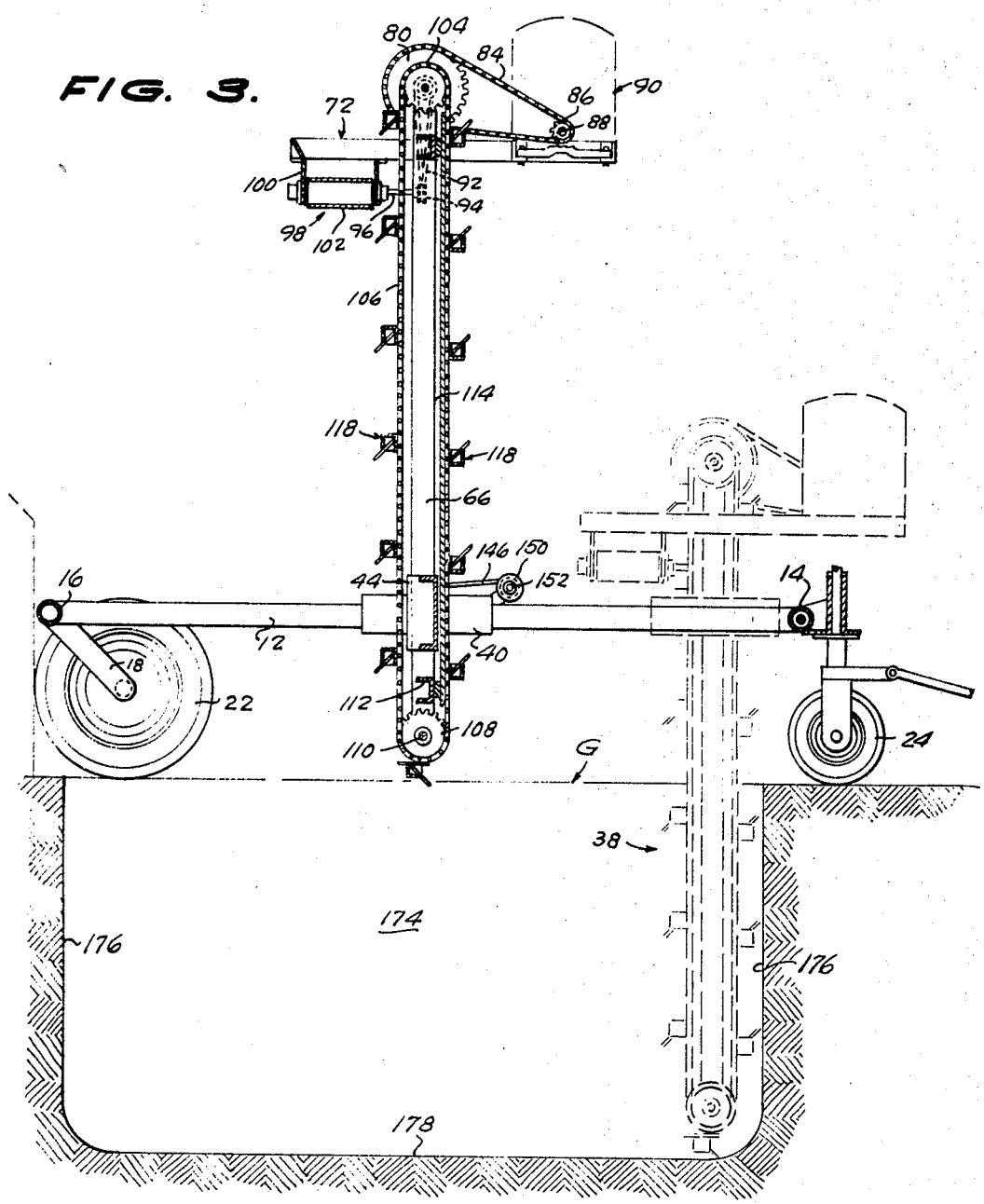

Oct. 28, 1969
G. C. PEARSON
3,474,551
MOBILE GRAVE EXCAVATOR
Filed Aug. 5, 1966
3 Sheets-Sheet 2
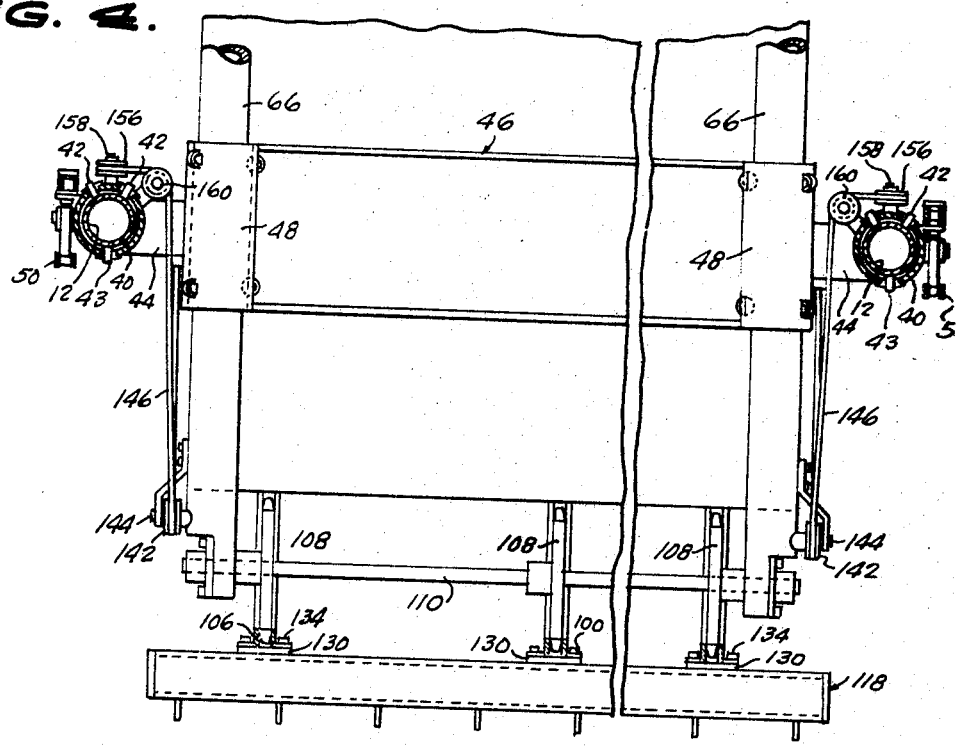
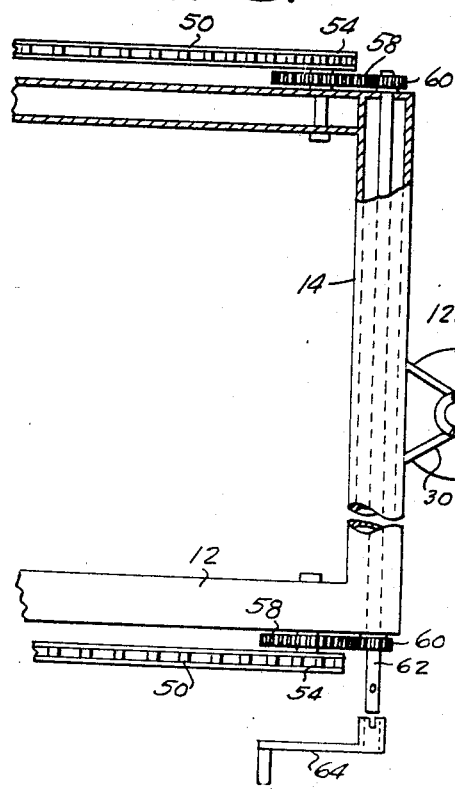
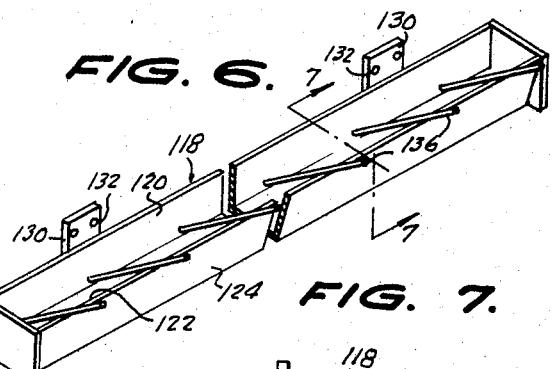
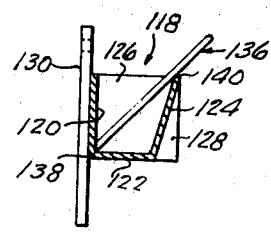
INVENTOR.
GUY C. PEARSON,
BY
Berman, Landoon & Berman
ATTORNEYS.

1

3,474,551
MOBILE GRAVE EXCAVATOR
Guy C. Pearson, Box 5233, Greenville, Miss. 38701
Filed Aug. 5, 1966, Ser. No. 570,509
Int. Cl. E02f 3/14
U.S. Cl. 37—192      8 Claims

ABSTRACT OF THE DISCLOSURE

A mobile excavator, especially but not exclusively for excavating graves, wherein a substantially vertical digging assembly is mounted on a substantially horizontal chassis for digging downwardly and laterally in the ground to form a grave or similar excavation.

---

This invention relates to a mobile excavator, especially, but not exclusively for excavating graves.

The primary object of the invention is the provision of an efficient and practical device of the kind indicated, which involves a wheeled chassis, adapted to be drawn by a tractor vehicle to the excavation site, a motor-operated digger assembly on the chassis, which is gravity-depressed and mechanically elevated to starting position, the digger assembly being adapted to be mechanically moved along the chassis as excavating progresses.

Another object of the invention is the provision of a device of the character indicated above, which assures the digging of excavations having parallel side walls and parallel end walls, which are perpendicular to the surface of the ground, and which has provision for excavating close to objects, such as grave stones.

In the drawings:

FIGURE 3 is a vertical longitudinal section, taken on the line 3—3 of FIGURE 1, showing the device disposed relative to an excavation, the digging assembly being shown in elevated starting position, in full lines, and in a depressed position, in the excavation, in phantom lines;

FIGURE 4 is an enlarged fragmentary vertical transverse section, taken on the line 4—4 of FIGURE 2;

FIGURE 5 is an enlarged and contracted fragmentary top plan view, taken from the line 5—5 of FIGURE 2;

FIGURE 6 is an enlarged and contracted perspective view of a digger assembly bucket; and, FIGURE 7 is a vertical section, taken on the line 7—7 of FIGURE 6.

Figure 1:
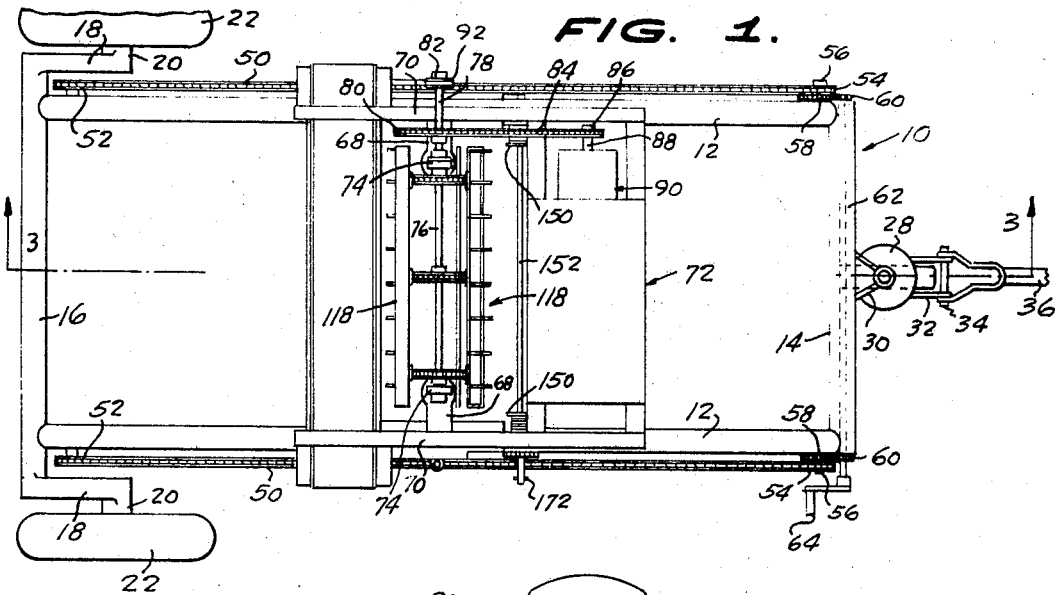
FIGURE 1 is a top plan view of a device of the invention.

Referring in detail to the drawings, the illustrated devices comprises a horizontal, longitudinally elongated chassis 10, which is composed of a pair of parallel spaced tubular side members 12 which, at their forward ends, are spaced and connected by a front cross member 14, and, at their rear ends, by a rear cross member 16. The rear cross member 16 extends beyond the side members 12, and terminates in forwardly and downwardly angled arms 18. The arms 18 terminate, at their lower ends, in lateral axles 20, on which relatively large diameter, rear, ground-engaging wheels 22 are journalled.

At its forward end, the chassis 10 is supported on and above the ground G, by a single, centered, relatively small diameter caster wheel 24, which is journalled in a fork 26. The fork 26 is rotated on a vertical axis in a mount 28, which is fixed on a bracket 30, extending forwardly from the middle of the front chassis cross member 14. A fixed drawbar 32 extends forwardly from the mount 28, and is adapted to be pivotally connected, as indicated at 34, to the rear end of a tractor vehicle tow bar 36.

2

It is to be noted that the forward off-setting, relative to the rear end of the chassis 10, of the rear wheels 22, enables the rear end of the device to approach close to a ground projection, such as a grave stone, in order to enable the digging assembly 38, of the device, to excavate close to an existing grave stone.

The digging assembly 38 comprises a pair of tubular horizontal slides 40, engaged on the chassis side members 12. As shown in FIGURE 4, the slides 40 are larger in diameter than the side members 12, and are concentrically spaced from the side members, by a pair of upper bearings 42 and a single lower bearing 43, carried by the slides and engaged with the side members.

The slides 40 are mounted on lateral horizontal arms 44 which are fixed to and extend laterally outwardly from a channel frame 46, the arms 44 being affixed to vertical tubular slides 48 on the ends of the frame.

Means are provided, on the chassis 10, for controllably moving the digging assembly 38, in opposite directions along the chassis, and retaining the adjusted positions of the digging assembly thereof. Such means can comprise sprocket chains 50, extending along the outer sides of the chassis side members 12, the chains being trained, at their rear ends, around rear idler sprocket wheels 52 mounted on the side members, at the rear ends thereof. At their forward ends, the chains 50 are trained around front sprocket wheels 54, journalled, as indicated at 56, on the chassis side members, adjacent to their forward ends. The front sprocket wheels 54 are fixed to gearwheels 58, which are in mesh with pinions 60, on the outer ends of a shaft 62, which is journalled through the front chassis cross member 14. Suitable braking or locking means (not shown), for precluding rotation of the shaft 62, after an adjustment of the digger assembly 38, along the chassis, and hence vagrant movement of the assembly 38, along the chassis 10, in either direction, may be provided. The chains 50 are suitably connected to the horizontal slides 40. A crank handle 64, is provided, to be engaged on an end of the shaft 62, for rotating the same.

The digger assembly 38 further comprises a pair of parallel spaced perpendicular, tubular uprights 66, which slide throught the vertical slides 48, and have affixed thereto, at points adjacent to and spaced downwardly from the upper ends of the uprights, lateral horizontal brackets 68, which reach out to and are suitable affixed to the longitudinal side members 70, of a horizontal platform 72, which extends rearwardly and forwardly, relative to the uprights 66.

The brackets 68 have, at their inner ends, upstanding arms 74, through which is journalled an upper sprocket wheel shaft 76. The left-hand end of the shaft 76 has an extension 78, which reaches laterally outwardly beyond the platform 72. The extension 78 has fixed thereon, intermediate its ends, a relatively large diameter drive sprocket wheel 80, and has a pulley wheel 82, on its outer end. A sprocket chain 84 is trained over the drive sprocket wheel 80, and over the sprocket wheel 86, on the drive shaft 88, of an electric motor 90, mounted on the forward part of the platform 72.

A flexible belt 92 is trained over the pulley wheel 82, and over a pulley wheel 94, on the driven shaft 96, of a conveyor belt assembly 98, which is mounted, as indicated at 100, to the underside of the rear part of the platform 72, and has an idler shaft, a conveyor belt 102 being trained over these two shafts. The belt 102, as indicated in FIGURE 3, is adapted to be reversed, on the pulley wheel 94, where it is desired to have the dirt deposited on the conveyor belt, discharged to one side or the other of the device.

On the main portion of the upper sprocket shaft 76, between the brackets 68, are fixed equally spaced upper sprocket wheels 104, over which are trained a corresponding number of digger conveyor sprocket chains 106. At their lower ends, the conveyor sprocket chains 106 are trained around lower sprocket wheels 108, on a lower sprocket shaft 110, which is suitably journalled on and extends between the lower ends of the uprights 66. Above the lower sprocket wheels 108, a channel cross brace 112 extends between and is fixed to the uprights 66, and an upwardly extending backing plate 114 is suitably fixed to the brace 112, and to the frame 44, and to the platform 72. The backing plate 114 is disposed immediately behind the front flights 116, of the conveyor chains 106, so that dirt-filled digging buckets 118, fixed on these chains, are prevented from discharging dirt, rearwardly, as they move upwardly.

The buckets 118, as shown in FIGURES 6 and 7, comprise horizontal transversely elongated hollow rectangular forms, having inner walls 120, bottom walls 122, outer walls 124, and end walls 126. The inner walls 120 are perpendicular to the bottom walls 122, while the outer walls 124 are angled away from parallelism with the inner walls, and the end walls 126, which are rectangular, have portions 128, which reach outwardly beyond the outer walls 124. Brackets 130, which extend above and below the buckets 118, are affixed to the inner sides of the inner bucket walls 120, and are provided with holes 132, adapted to receive bolts 134, which attach the buckets to the conveyor chains 106.

As shown in FIGURE 7, digging fingers 136 are equally spaced along the buckets 118, with the fingers 136, of adjacent buckets being staggered so as to operate in the spaces between adjacent fingers of the other buckets. The fingers 136 have depressed inner ends fixed, as indicated at 138, at the junctures of the inner walls 120 and the bottom walls 122, of the buckets, the fingers being disposed at an acute angle to the bottom walls and extended outwardly and upwardly relative to the bottom walls 122, and over and outwardly beyond the outer walls 124. Intermediate portions of the fingers overlie and are suitably fixed to the upper digging edges 140, of the outer walls 124. As the buckets 118 move downwardly, along the rear side of the digging assembly 38, and move forwardly and around the lower end thereof, the fingers 136 serve to loosen and dig dirt and move the dirt into the buckets, in conjunction with the digging edges of the outer walls 124, so that, as the buckets rise, at the forward side of the assembly, they are filled with dirt, which may dump onto the transverse conveyor belt 102, of the conveyor assembly 98, as the buckets move rearwardly and downwardly beyond the uppermost point of their travel.

Figure 2:
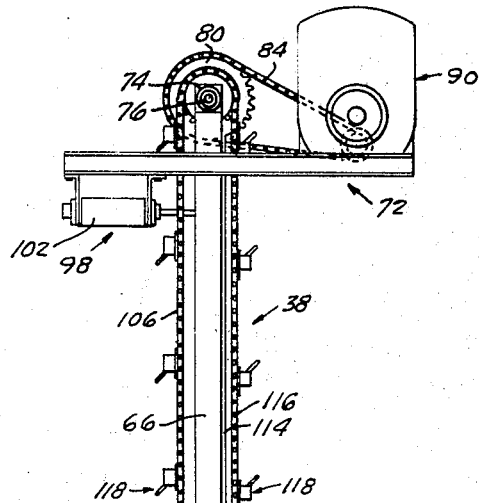
FIGURE 2 is a side elevation of said device, the digging assembly being shown in elevated starting position.

Means are provided, for elevating the digging assembly 38, to its elevated starting position, shown in full lines in FIGURES 2 and 3, wherein the digging conveyor is on a level with the top of the ground; and for holding and controllably releasing the assembly to move gravitationally downwardly, relative to the chassis 10, as digging proceeds. These means comprise a pulley and cable assembly which involves lower pulleys 142, journalled, as indicated as 144, on the outer sides and at the lower ends of the uprights 66, as shown in FIGURE 4, over which cables 146 are trained. At one end thereof, the cables 146 are secured to the undersides of the horizontal slides 40, as indicated at 148, in FIGURE 2, the other ends of the cables being wound around drums 150, on a drum shaft 152, which is journalled through upwardly and rearwardly angled brackets 154, fixed on the horizontal slides 40. The cables 146 are also trained around upper vertical axis pulleys 156, journalled, as indicated at 158, on the tops of the horizontal slides 40, and over horizontal axis pulley wheels 160, mounted on the inner sides of the slides 40.

The drum shaft 152 has, on one end thereof, a fixed ratchet wheel 162, which is engaged by a releasable ratchet pawl 164, which is pivoted, as indicated at 166, on another bracket 168, fixed on a horizontal slide 40, rearwardly of the ratchet wheel. The pawl 164 is equipped with a forwardly reaching handle 170, which is adapted to be manually grasped and moved, for releasing and engaging the pawl.

One end of the drum shaft 152 has means 172, to accommodate the crank handle 64, by means of which the shaft 152 is adapted to be manually rotated to elevate the digging assembly 38.

In use and operation, the device having been moved to the selected excavation site, with the digging assembly 38 in its elevated position, the assembly 38 is moved along the chassis 10, to either end thereof, depending upon from which end of the proposed excavation digging is to be started. The motor 90 is then actuated to operate the buckets 118, and the assembly 38 is released, by releasing the ratchet pawl 164, from the ratchet wheel 162, so that the assembly can descend gravitationally and make digging contact with the ground G. The depths at which the buckets penetrate the ground is controlled by operation of the ratchet pawl. As the digging proceeds, the assembly 38 is moved along the chassis 10 toward the finishing end of the excavation. As a result, the excavation made has parallel side walls 174, parallel end walls 176, and a flat bottom wall 178, as shown in FIGURE 3.

What is claimed is:

1. A mobile excavator, comprising a wheeled horizontal chassis, a substantially perpendicular digging assembly, means mounting said assembly on the chassis for movement therealong, means for moving the assembly along the chassis in opposite directions, said digging assembly being supported on said mounting means for vertical movements relative to the chassis, elevating means on the chassis and connected to said assembly for elevating the digging assembly relative to the chassis, said chassis having parallel spaced horizontal side members, said digging assembly having horizontal tubular slides slidably engaged on the chassis side members and vertical tubular slides supported on the horizontal slides, said digging assembly having uprights slidably engaged in the vertical slides, a frame extending between and connected to said vertical slides, vertical digging conveyor means disposed in an endless path beyond said uprights, motor means connected to the uprights near the upper ends thereof, said motor means being operatively connected to the digger conveyor means, said digger conveyor means comprising an upper shaft journalled on the uprights at the upper end thereof, said upper shaft having upper sprocket wheels spaced therealong, conveyor chains trained over said upper sprocket wheels, a lower shaft journalled on the uprights at the lower ends thereof, lower sprocket wheels on the lower shaft in line with the upper sprocket wheels, the chains being trained under the lower sprocket wheels, means connecting said motor means to one of said shafts, and digging buckets secured to the sprocket chains at spaced intervals therearound.

2. A device according to claim 1, including:
said sprocket chains having forward flights, and a backing plate located behind said forward flights and mounted to the uprights.

3. A device according to claim 1, including:
said sprocket chains having forward flights, a backing plate located behind said forward flights and mounted to the uprights, each of said buckets having a bottom wall, end walls, an inner wall attached to the sprocket chains, and a plurality of cutting fingers projecting outwardly from said bottom wall to engage the area to be dug.

4. A device according to claim 3, wherein:
said cutting fingers on the buckets extend outwardly therefrom, and said fingers are spaced along the buckets with the fingers of adjacent buckets being staggered relative to each other.

5. A device according to claim 3, wherein:
each of said buckets has an outer wall having a free digging edge, each of said fingers has an inner end engaged with the intersection of the inner wall and the bottom wall, each of said fingers being fixed intermediate its ends on the digging edge of the outer wall, and said fingers on each bucket reaching outwardly beyond its outer wall.

6. A device according to claim 1, including: said digging buckets being secured to the sprocket chains at equally spaced intervals therearound, a horizontal platform mounted on the uprights near the upper ends thereof and extending to opposite sides of the uprights, and a belt conveyor assembly on the platform, said belt assembly having a conveyor belt operatively connected to said motor means, said conveyor belt being located to receive dirt from the buckets as the buckets pass over the upper sprocket wheels.

7. A conveyor type digging bucket including an elongated substantially rectangular bottom wall having a laterally extending end wall at each respective end thereof with said end walls being disposed in longitudinally spaced, parallel and confronting relation relative to one another, a longitudinally extending inner wall projecting laterally from and substantially perpendicularly to said bottom wall in the same direction as said end walls, and a plurality of longitudinally spaced cutting fingers projecting outwardly beyond the bottom wall in a direction away from said inner wall, an outer wall projecting laterally from said bottom wall and angling away therefrom in a direction away from said inner wall, said outer wall having a digging edge formed at its outer end, and said cutting fingers comprising a plurality of elongated elements each having opposed ends, said elements extending transversely across said bottom and said digging edge, said elements having one of their respective adjacent ends fixedly secured within said bucket and their respective opposed adjacent ends projecting beyond and being fixedly secured to said digging edge.

8. Apparatus as defined in claim 7, wherein said one ends of said fingers are fixedly secured in said bucket at the junction of said inner and outer walls.

References Cited

UNITED STATES PATENTS

| | | | |
|---|---|---|---|
| 587,697 | 8/1897 | Brash | 198—152 |
| 1,050,361 | 1/1913 | Halle | 37—86 XR |
| 1,224,323 | 5/1917 | Rice | 37—90 |
| 2,653,795 | 9/1953 | Reeves | 255—1 |
| 2,884,721 | 5/1959 | Pool | 37—85 |
| 2,998,891 | 9/1961 | Baur et al. | 187—9 XR |
| 3,015,175 | 1/1962 | Smith | 37—192 |
| 3,107,444 | 10/1963 | Crum et al. | 37—80 |
| 716,124 | 12/1902 | Spangler | 37—137 |
| 797,503 | 8/1905 | Dunn. | |
| 1,691,809 | 11/1928 | Huenefeld et al. | 37—190 |

ROBERT E. PULFREY, Primary Examiner

CLIFFORD D. CROWDER, Assistant Examiner

U.S. Cl. X.R.

37—142; 198—152